United States Patent [19]

Bennett et al.

[11] Patent Number: 4,595,231
[45] Date of Patent: Jun. 17, 1986

[54] CARGO HAULING ROAD VEHICLE

[75] Inventors: Paul F. Bennett, San Marino; James M. Warwick, Whittier; George J. Caird, Fullerton, all of Calif.

[73] Assignee: Utility Trailer Manufacturing Company, City of Industry, Calif.

[21] Appl. No.: 400,427

[22] Filed: Jul. 21, 1982

[51] Int. Cl.$^4$ .............................. B62D 25/02
[52] U.S. Cl. ........................ 296/181; 296/29; 52/573; 403/220
[58] Field of Search .............. 296/181, 2, 3, 29; 403/220, 224; 180/89.1, 311; 280/104; 52/167, 403, 573

[56] References Cited

U.S. PATENT DOCUMENTS

| 759,628 | 5/1904 | Nicolai. | |
|---|---|---|---|
| 1,405,485 | 2/1922 | Callery. | |
| 1,772,414 | 8/1930 | Brooke-Hunt et al. | 403/224 |
| 1,892,943 | 1/1933 | Geyer | 403/220 |
| 2,564,888 | 8/1951 | Foley et al. | 180/89.1 |
| 3,453,020 | 7/1969 | Santillo, Jr. | 296/100 |
| 3,612,581 | 10/1971 | Frankenberg et al. | 403/224 |
| 3,709,552 | 1/1973 | Broadbent | 296/181 |
| 4,222,606 | 9/1980 | Brown et al. | 296/183 |
| 4,357,048 | 11/1982 | Zehnder et al. | 296/183 |
| 4,408,793 | 10/1983 | Broadbent | 296/183 |

FOREIGN PATENT DOCUMENTS

| 239805 | 9/1925 | United Kingdom. |
|---|---|---|
| 247689 | 2/1926 | United Kingdom. |
| 247610 | 6/1926 | United Kingdom. |
| 258188 | 9/1926 | United Kingdom. |
| 249878 | 6/1927 | United Kingdom. |
| 347427 | 4/1931 | United Kingdom. |
| 373058 | 5/1932 | United Kingdom. |
| 1002675 | 8/1965 | United Kingdom. |
| 2055763 | 3/1981 | United Kingdom. |
| 2111916 | 7/1983 | United Kingdom. |

Primary Examiner—Robert B. Reeves
Assistant Examiner—Russell D. Stormer
Attorney, Agent, or Firm—Lyon & Lyon

[57] ABSTRACT

A road vehicle for hauling cargo has a substantially rectangular flatbed member with front and rear upright walls. The front wall is attached to the flatbed by a semi-rigid joint and the rear wall is attached to the flatbed by a free swinging hinged joint. One or more longitudinal members extend between the top of the front and rear walls. Posts spaced longitudinally of the cargo vehicle extend from the elevated longitudinal member or members to the flatbed member. One or more of the posts are collapsible or swingable to be selectively movable to a position for unobstructed access for side loading and unloading of the vehicle.

47 Claims, 18 Drawing Figures

CARGO HAULING ROAD VEHICLE

This invention relates to road vehicles for hauling cargo, such as trucks or trailers. In each case there is a rectangular flatbed frame subjected to deflection and longitudinal twisting in service under load, as the vehicle travels over uneven roadbeds. For example, when the vehicle makes a turn toward the side of a crowned road into an upward inclined ramp there may be considerable twisting and deflection of the flatbed frame. This invention is particularly directed to improvements which permit flexure of the various other parts of a cargo hauling road vehicle such as the vertical supports, roof, and end walls to minimize fracture or failure of such parts upon twisting and deflection of the flatbed frame. The structure embodying this invention also absorbs forward acting bulkhead loads due to cargo shift, and side and rear loads associated with cargo restraint.

This invention finds usefulness in a wide range of cargo body styles having open sides, open roofs, solid roofs, single upper member bodies, front wall frames open and closed, and rear wall frames, closed or with openings. This type of cargo hauling vehicle is particularly useful when the side walls are comprised of collapsible curtains, rather than rigid walls, which curtains have the effect of converting the truck or trailer into a van, such as disclosed in U.S. Pat. No. 3,709,552 "Van Bodies".

Many present day cargo hauling vehicles have a flatbed frame and superposed side and end members which are relatively rigid, and will tend to limit twisting about the longitudinal axis of the vehicle in response to variations in side slope of the roadbed. However, if the vehicle is essentially an open sided, rectangular parallelpiped, i.e. a flatbed frame with a roof supported from the end walls but without side walls, then one lateral edge of the front and rear wall frames tend to deflect forward and the other lateral edge deflects rearward under such conditions of longitudinal twisting to form the side openings into non-rectangular parallelograms. In addition, all six sides (including the flatbed frame being the sixth side) warp out of plane (i.e. are no longer flat) and the included angles between the flatbed or roof and the end frames become greater or less than right angles, while the corners in the plane of the roof and the flatbed remain essentially at right angles.

On the other hand, if the upper longitudinal structure, i.e. the roof, consists of one or multiple parallel members, the end wall frames are not induced to warp out of plane, and the upper members are not subjected to bending forces if they are free to pivot about vertical axes at both ends even though the flatbed frame warps as a result of the twisting force imposed by an uneven road bed.

Further, normally the roof structure of this type of open-sided trailer vehicle is of such length that one or more support posts are required to avoid the necessity of a roof structure of inordinate size and weight to accomplish the free span between the front and rear walls where there are no side walls to provide such support. However, such posts create two problems in an open-sided vehicle, namely, they obstruct the free access to the flatbed for cargo loading and unloading, and if they are rigidly attached to the flatbed and roof structure they experience the same problem of tending to bend or angularly displace from the roof and flatbed as the vehicle twists and bends over an uneven road bed.

A principle object of this invention is to provide a vehicle structure of the type having open sides in which the flatbed frame, end walls, support posts, and roof structure are connected to each other with an appropriate combination of rigid joints, semi-rigid joints, and fully flexible or pivotable joints to allow twisting and bending of the flatbed frame on uneven road beds with limited but relatively free movement between the other components.

Another object of this invention is to provide a unique combination of types of connections between the flatbed frame, roof structure, and end walls of an open sided cargo vehicle to permit twisting and bending of the flatbed frame without undue forces applied to any of the joints between those components. and yet provide sufficient strength and rigidity against angular movement in the front and rear walls to contain the cargo against forward and rearward movement. A still further object is to provide such a vehicle in which side posts for supporting the roof structure are of a unique construction to permit movement thereof to various positions to allow unobstructed side access to the vehicle for loading and unloading.

Other and more detailed objects and advantages will appear hereinafter.

Figure 1:
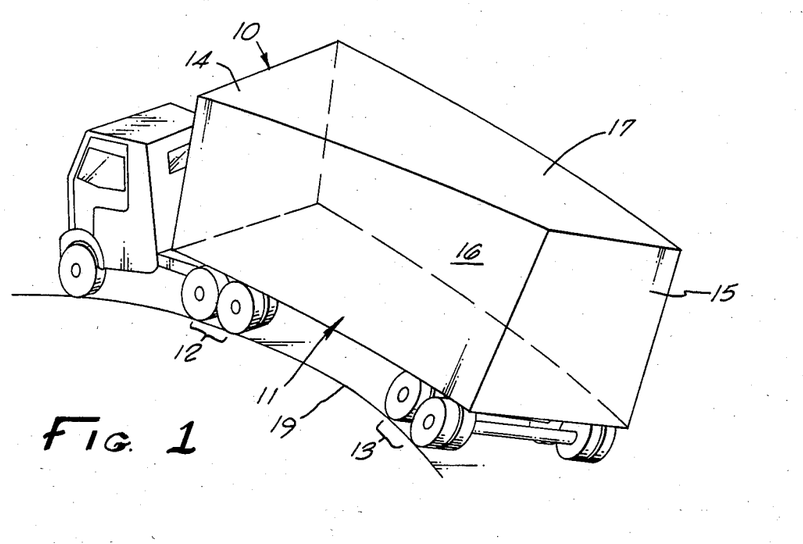
FIG. 1 is a perspective view of a truck and semi-trailer moving on a roadbed which is curved in more than one direction. The flexure of the six walls of the cargo trailer is exaggerated for purposes of illustration.
Figure 2:
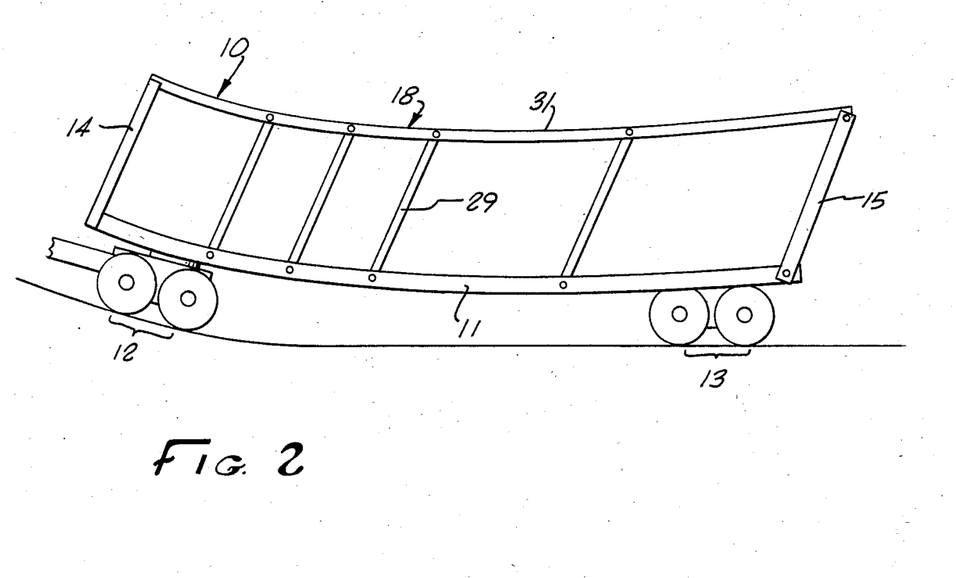
FIG. 2 is a side elevation of a similar vehicle showing an exaggerated degree of vertical deflection under load on a road bed curving upward.

Referring to the drawings, the cargo hauling vehicle generally designated 10 has a rectangular flatbed frame 11 supported on road wheel assemblies 12 and 13 at the front and rear, respectively, of the vehicle in conventional manner. The vehicle has a front wall 14, a rear wall 15, and side walls 16 and 17. The term "wall" as used herein includes a wall frame, whether open, partially closed or having doors or other closures such as canvas or plastic curtains, or netting or the like. A roof or a roof frame 18 extends between the side walls 16 and 17 and the front and rear walls 14, 15. When the vehicle 10 travels over a roadbed 19 such as that shown in FIGS. 1 and 2 all six walls, including the flatbed frame 11 and the roof or roof frame 18, tend to change shape, and these distortions are exaggerated in FIGS. 1 and 2. The degree and form of the shape change of a wall depends on the twisting and deflection forces imposed on the flatbed frame and the rigidity of each wall and joint. In FIG. 1 each of the walls is depicted, in an exaggerated manner, as being warped to accommodate the twisting and deflection of the flatbed 11. In FIG. 2 one aspect of this invention is depicted in that by providing relatively flexible joints at some or all of the connections between the flatbed frame, front and rear walls, support posts, and the roof structure there can be angular displacement therebetween whereby the side openings may form somewhat non-rectangular parallelograms thereby allowing the roof and end walls to warp (with the flatbed frame) and reducing the destructive forces imposed upon the roof and end walls, as well as the joints therebetween.

Figure 3:
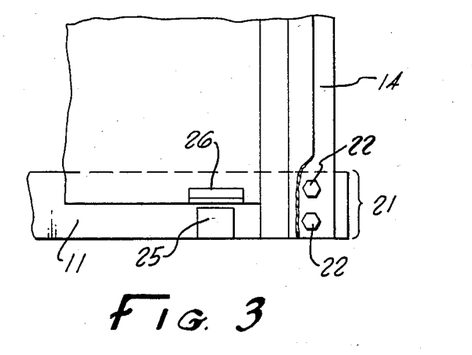
FIG. 3 is a front elevation.
Figure 4:
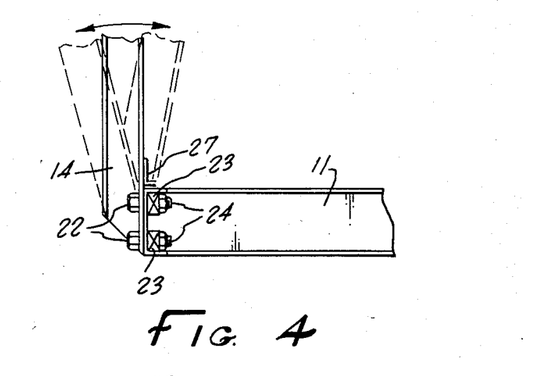
FIG. 4 is a side elevation.
Figures 4A, 5, 7A:
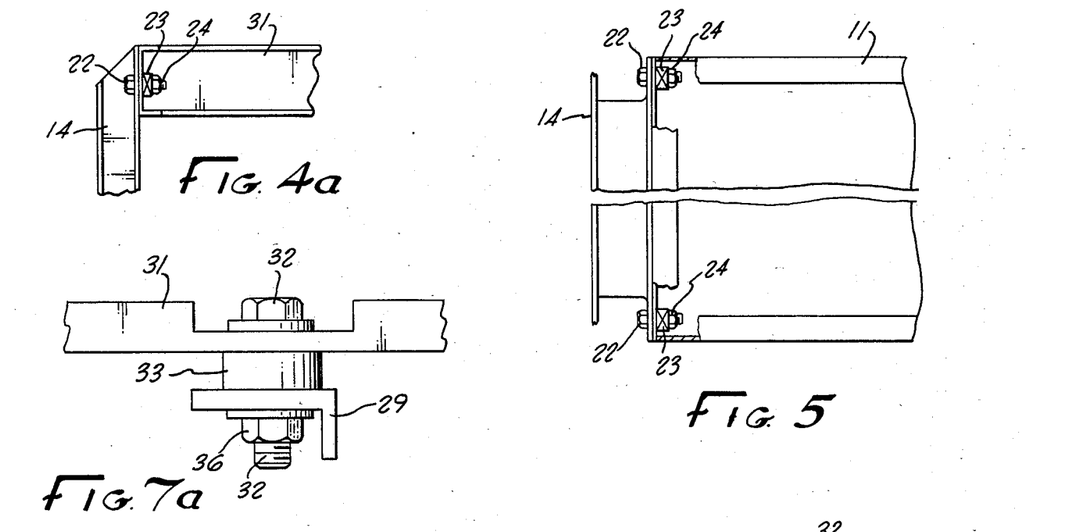
FIG. 5 is, a bottom plan view showing details of attaching the front wall of a vehicle to the flatbed frame, the views being partly broken away.
FIG. 4a is a side elevation similar to FIG. 4 showing one form of connection at the front, upper corner of the vehicle.
FIG. 7a is a plan view similar to FIG. 7 but illustrating a form of connection between an upper longitudinal member and a side post.

As shown in FIGS. 3, 4 and 5, a semi-rigid joint 21 preferably connects the front end of the flatbed frame 11 to the front wall 14 and provides sufficient flexibility so that the front wall 14 or its frame may deflect forwardly and rearwardly, and in a forward direction on one side and in a rearward direction on the other side. Tension connectors 22 may take the form of bolts or other fasteners which extend through openings in adjacent flanges of the flatbed frame and front wall 14, and which also extend through elastic, resilient or energy-storing blocks 23 which are clamped in place by nuts 24. The semi-rigid joint thus formed permits some limited pivotal movement of the front wall or its frame with respect to the flatbed frame 11. This movement is in the direction of the double ended arrow as shown in FIG. 4, but is exaggerated. These semi-rigid joints perform the functions of supporting the wall, storing energy in the joint that tends to restore the wall to its upright position when the distorting forces are relieved, and limiting the magnitude of deflection to a reasonable degree. Additional means may be provided for causing a positive limitation on deflection but normally the bolts 22 are adequate. Various forms of semi-rigid joints may be acceptable, such as; a pivotal connection with torsion bars or springs mounted to restore the wall to its upright position; leaf springs actually forming the joint and support; posts or pins positioned in elastomeric sockets; a pivoted joint with limit stops to allow a predetermined amount of free pivoting; a post in an oversized socket allowing limited free movement; etc.

The semi-rigid joint or joints 21 shown in the drawings act to resist fore-and-aft loads by alternately compressing the energy storing components thereof, such as devices 23, and they serve to restore the front wall to a vertical plane after removal of the load. Downward vertical forces including the weight of the front wall 14 may be transmitted to the flatbed frame 11 independently of the semi-rigid joint 21 by means of a stop lug 25 on the flatbed frame 11 and the protruding lip 26 on the front wall 14 as shown in FIG. 3. The same effect can be achieved by the alternate means of an abutment 27 on the front wall 14 which may engage the front upper surface of the flatbed frame 11 as shown in FIG. 4.

As best shown in FIGS. 3 and 5, the vertical posts on each lateral side of front wall 14 are preferably of an open cross-section to accommodate twisting about a vertical axis as the front wall warps and flexes. This open cross-section faces outwardly of the vehicle and may provide a recess or housing for the side curtain tensioning pole (not shown in FIGS. 3, 4 and 5 but shown in FIG. 8 and identified by the numeral 59) to be described below. The forward leg of this open sectin is shorter than the rear, as best shown in FIG. 5, to improve the air flow characteristics around the front corners thereby reducing the billowing of the side curtains when the vehicle is under way while at the same time providing greater clearance with the truck-tractor for sharp turns and maneuvering when the vehicle is a trailor.

While it is preferred that front wall 14 be connected to the flatbed frame 11 by a semi-rigid joint as described above, it has also been found that a rigid connection may be used there as shown in FIG. 2, or at the rear wall with the other joints between the end walls and both the flatbed frame and roof being flexible or pivotable, as hereinafter described, with satisfactory results.

Figure 6:
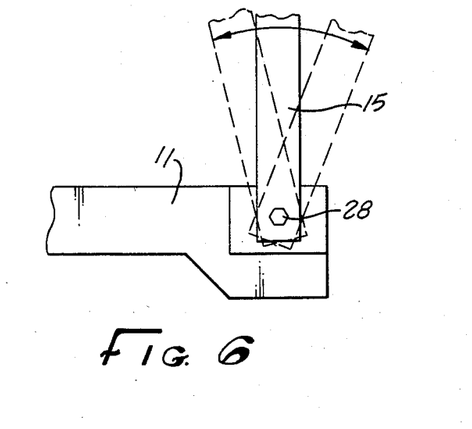
FIG. 6 is a side elevation partly broken away, showing the pivotal attachment of the rear wall of the vehicle to the rear portion of the flatbed frame.

The rear wall 15 may be connected to the flatbed frame 11 in a similar, semi-rigid manner, but it is preferred that one of the walls 14 or 15 be pivotally mounted for free swinging movement about the flatbed frame. If both walls 14 and 15 are pivotally mounted then means must be provided to limit angular movement of at least one wall which may be essentially the same as providing one wall with a rigid or semi-rigid joint at the flatbed frame or at the roof. FIG. 6 illustrates a pivotal connection by hinge pin 28 between flatbed frame 11 and rear wall 15 with the movement shown in the direction of the double ended arrow but is exaggerated.

Figure 7:
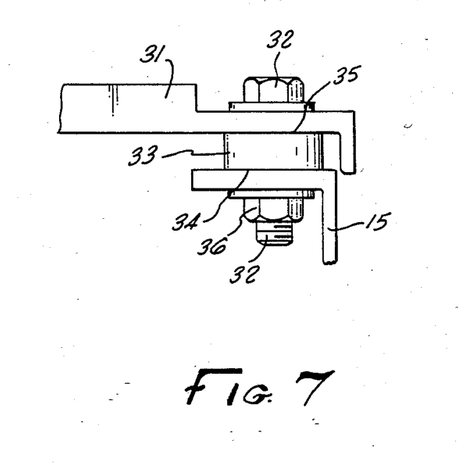
FIG. 7 is a side elevation of a detail, partly broken away, showing a resilient pivotal connection at the joint between the upper longitudinal member and the rear wall.

The connection between the upper end of rear wall 15 and the longitudinal members 31 of the roof structure 18 is preferably a more flexible pivotal connection as shown in FIG. 7 and a similar connection may be provided between members 31 and front wall 14. A fastener or bolt 32 extends through openings in the longitudinal member 31 and the top of the rear wall 15 with a resilient block 33 which may extend across the top of rear wall 15 as a seal compressed between the facing surfaces 34 and 35 of the rear wall 15 and member 31, respectively. A nut 36 connected to the bolt 32 secures the joint. In this manner the joint between the longitudinal member 31 and the rear wall 15 may pivot and flex to accommodate angular movement therebetween. As an alternative, the pivotal axis of the joint between the wall and roof may be horizontal as shown in FIG. 7a described below. Any form of double hinged joint, universal joint, ball and socket, or the like may be used that will provide freedom of movement at the joint. A similar pivotable joint may be provided at the connection of the upper end of the front wall 14 and longitudinal member 31 for maximum flexibility or a semi-rigid joint, as shown in FIG. 4a, may be provided at that connection. The joint shown in FIG. 4a is similar to the semi-rigid joints shown in FIGS. 3, 4 and 5 and may include a fastener or bolt 22 extending through openings in the front wall 14 and a flange on longitudinal member 31 with a resilient block 23 clamped in place by nut 24 on the bolt 22. Thus it should be understood that the corner joints may be of any form, semi-rigid, pivotable or completely flexible, all referred to herein and in the claims sometimes as a "non-rigid" joint as distinguished from a welded or tightly bolted joint intended to be rigid although, of course, every corner joint has some degree of bending or flexure. Any combination of non-rigid joints may be employed for all the joints.

As best shown in FIG. 2, a series of posts 29 may extend between the flatbed frame 11 and the longitudinal members 31 which define the side edges of the roof or roof frame 18 or the posts may be located intermediate the sides of the vehicle. Flexibility may be provided at the connections between the longitudinal members 31 and the posts 29 by the structure shown in FIG. 7a (a plan view) which is similar to that shown in FIG. 7 (an elevation view). The fasteners 32 each extend through openings in the member 31 and the post 29 to act as a hinge pin therebetween, the member 31 and post 29 may be in metal-to-metal contact or a resilient block 33 compressed therebetween by means of the nut 36, or any other form of connection which will allow pivoting. The lower ends of the posts 29 may be freely pivoted to the flatbed frame 11 or similarly fastened. The posts 29 may be positioned at intervals along the outer edges of the flatbed frame 11, or if desired they can be positioned at intervals along the length of the flatbed frame and centrally thereof. In such case, only one central, longitudinal member 31 may extend between the front and rear walls 14 and 15.

An important application of the device of this invention lies in connection with side curtains which enclose the cargo space, that in effect converts the vehicle into a van. Also side nets may be used for restraining the cargo with or without the side curtains. The curtains and/or nets may be retractable or removable so that the open sides or rear end of the vehicle can permit random access to the cargo, as well as easy loading of elongated cargo such as pipe. Quick loading may be accomplished on both sides of the vehicle, or side loading from a stationary dock. However, while the posts 29 as described above satisfactorily support the roof against normal wind and snow loads, as well as the downward tension of the side curtains, thereby avoiding an excessively strong and heavy roof structure to span that distance, and further those posts 29 allow complete flexing of the other four sides of the vehicle (namely, the flatbed frame, roof and two end walls), those posts provide an obstruction to loading and unloading cargo from the side of the vehicle and therefore as a part of our invention we have provided alternate embodiments shown in FIGS. 8 through 14 of the permanently attached posts 29 previously described.

In the embodiment of a post construction shown in FIGS. 8 through 11, any desired number of posts, generally designated 40, may be provided along the length of the vehicle. Each post 40 is "C"-shaped having a vertical member 41 from which extends an upper horizontal arm 42 and a lower horizontal arm 43. The extending ends of the arms 42 and 43 are pivotally connected to the side of the vehicle to permit swinging back lines in FIGS. 8 and 9 to provide an increased length of unobstructed side access to the vehicle by such selective movement of the post 40. The arms 42 and 43 are of sufficient length that the swinging movement between the two positions creates a sufficient distance (i.e. twice the arm length) to clear one side or the other of most objects being loaded on the vehicle, particularly large unitized or palletized loads. An elongated pivot pin 44 pivotally connects upper arm 42 to a bracket 45 on the longitudinal member 31. Similarly, an elongated pivot pin 46 connects the lower arm 43 to a bracket 47 on the side of flatbed frame 11. The vehicle is considered with the two pivot pins 44 and 46 vertically aligned and with sufficient length to allow some vertical travel of the ends of the arms 42 and 43. Such travel is particularly useful when the roof structure 18 shifts longitudinally relative to the flatbed frame 11 as shown in exaggerated form in FIG. 11, whereby pins 44 and 46 become displaced from vertical alignment and the upper contact end 48 of the post 40 may separate from a bearing plate 49 on longitudinal member 31 while the lower end 50 of post 40 bears against bearing plate 51 and yet the lower pivot pin 46 allows the free end of lower arm 43 to separate from bracket 47 to reduce the strain on the lower arm 43, thereby forming non-rigid connections between the post and both the roof and the flatbed frame. By using the bearing plates 49 and 51 to contact the extended ends of the vertical member 41 of the post 40 rather than carry the load solely by the free ends of the arms 42 and 43 attached to the brackets 45 and 47 the bending strains on post 40 are minimized. As an alternative, the post 40 can be of sufficient strength and rigidity to accomplish the support from the brackets 45 and 47 through the arms 42 and 43 without bearing plates 49 and 51.

Figure 10:
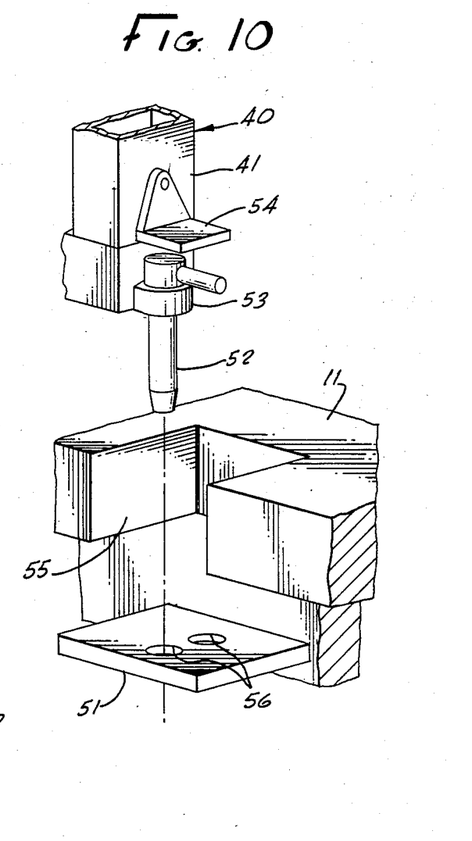
FIG. 10 is an exploded perspective view of the latching mechanism for the side post of FIG. 8.
Figure 11:
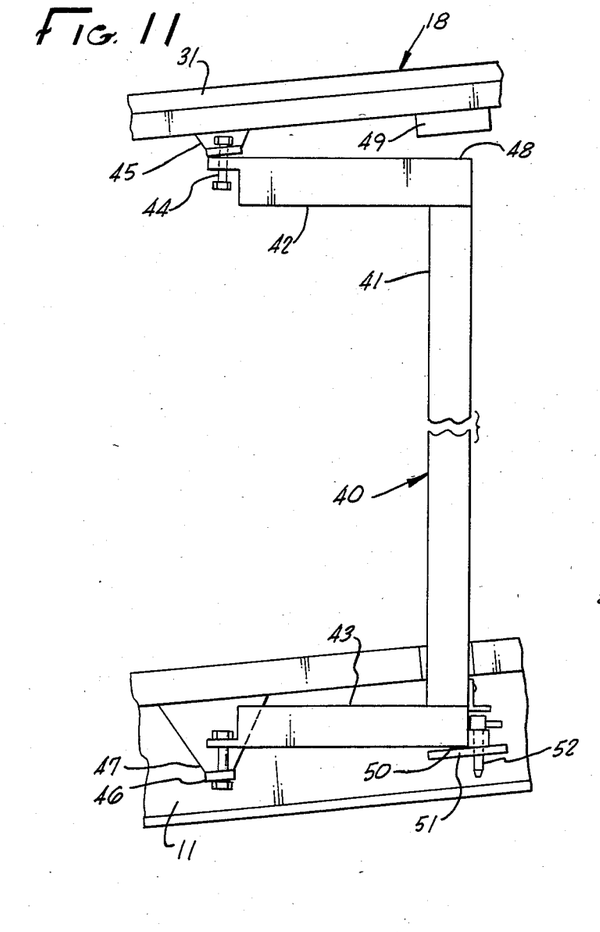
FIG. 11 is a side elevation of the side post of FIG. 8 showing an exaggerated position thereof upon longitudinal relative displacement of the vehicle frame and roof.

The post 40 is provided with means for locking it in a position for normal highway travel which means may include a latch pin 52 slidably mounted on a bracket 53 connected to the lower swinging end of the post. A keeper 54 is pivotally mounted above pin 52 to prevent the pin from being inadvertently lifted and dislodged but the keeper may be pivoted out of the way to extract pin 52. In FIG. 10 the post 40 is illustrated as elevated directly above the bearing plate 51 as an exploded view. A recess 55 is created in the side of the flatbed frame 11 to accommodate the vertical member 41 of the post 40 whereby the outer surface of the post in its normal highway-operating position does not extend beyond the side of the flatbed frame 11. One or more holes 56 are provided in the bearing plate 51 for selective engagement by the latch pin 52 to properly position the post 40. More than one hole 56 may be required to accommodate oversized or obstructing loads positioned on the flatbed frame 11.

Figures 8, 9:
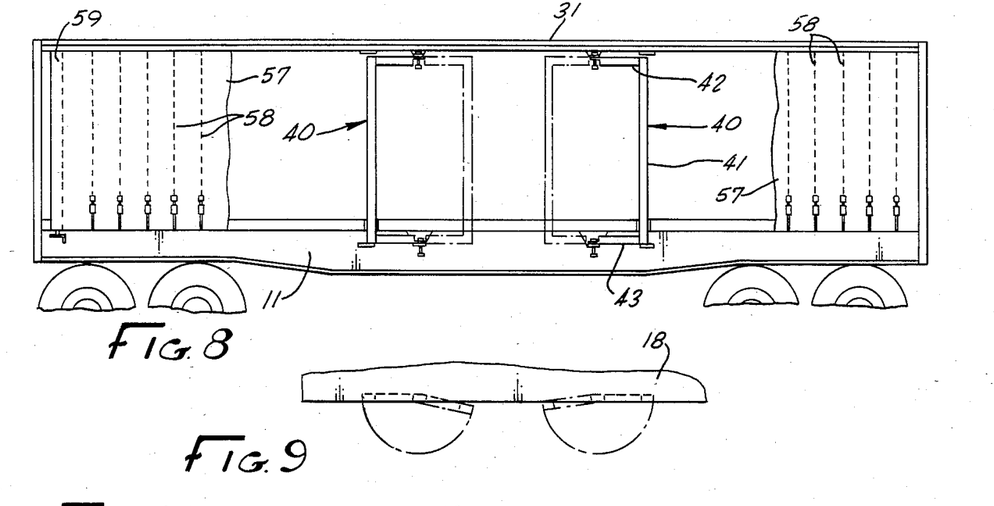
FIG. 8 is a side elevation of a vehicle with side curtains and straps with portions broken away and showing a first alternate embodiment of side posts showing alternate positions thereof in phantom lines.
FIG. 9 is a plan view of the side posts of FIG. 8.

FIG. 8 also illustrates the flexible side curtains that may be used on any of the embodiments of this invention. Specifically, the curtain 57 is supported along its upper edge by rollers to allow it to be pulled longitudinally to open or close the sides of the vehicle. Vertically extending straps 58 are employed to securely fasten the canvas to the flatbed frame. A roll mechanism 59 at one end is used to horizontally tension the curtain 57 before attaching and tensioning the straps 57. It is to be noted that straps 58 tend to pull the roof edge members 31 downwardly upon tensioning and the shifting of cargo against the curtain can cause further downward deflection, even causing loosening of adjacent straps. The posts minimize these problems.

Figures 12, 13, 14:
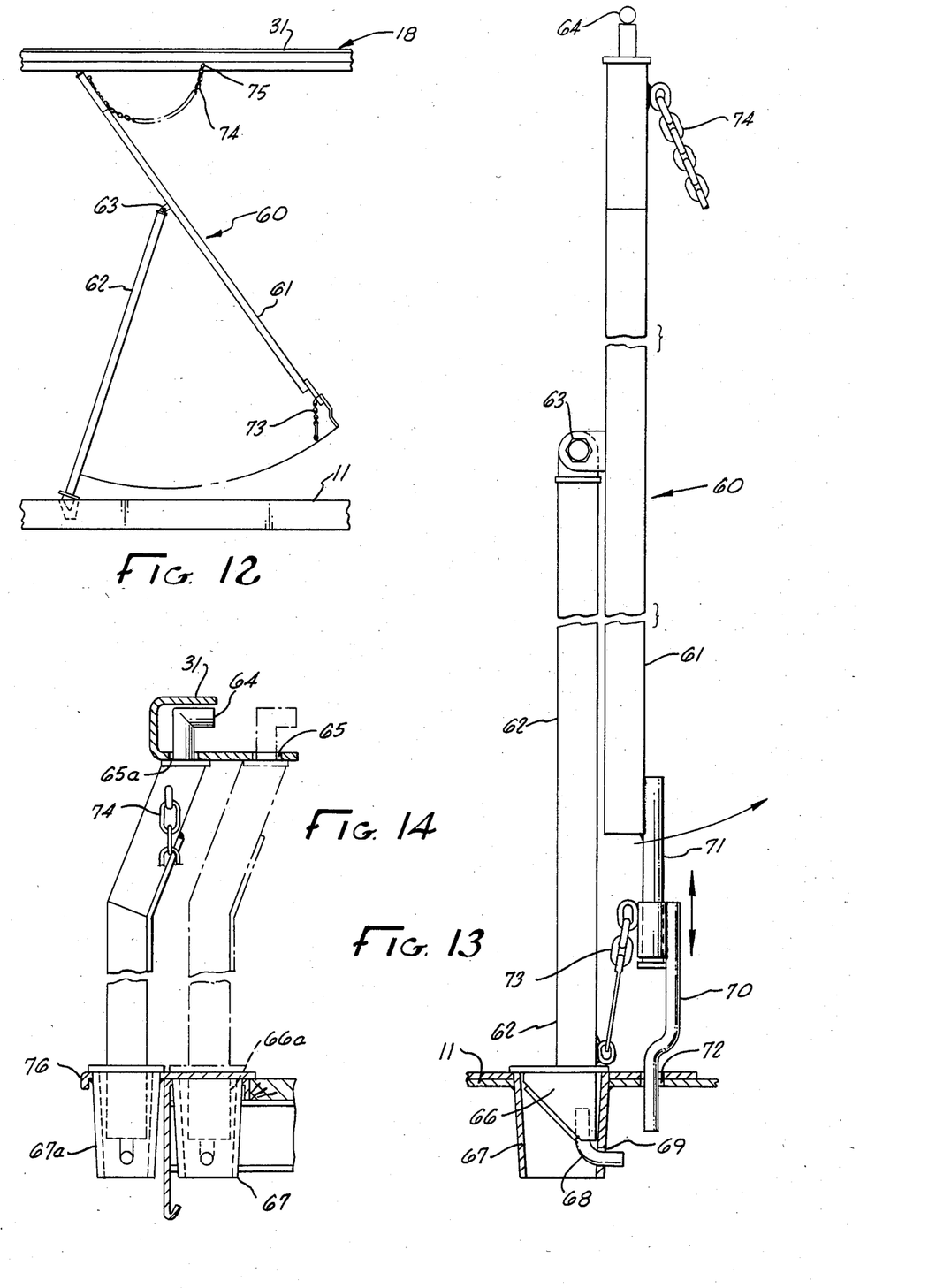
FIG. 12 is a side elevation of a second alternate embodiment of a side post.
FIG. 13 is an enlarged side elevation of the side post of FIG. 12 shown in the locked position.
FIG. 14 is an end elevation of the the side post of FIG. 12 and illustrating alternate positions of the side post with a removable bracket for positioning the post on the outside of the vehicle frame for accommodating cargo that is the full width of the vehicle.

A second embodiment of a displacable form of side post is shown in FIGS. 12, 13 and 14 and is generally indicated as 60. Post 60 comprises two members 61 and 62 with the upper end of the lower member 62 pivotally connected at 63 to an intermediate point along the length of member 61. The upper end of member 61 has an angled rod 64 adapted to be inserted through an elongated opening 65 in the longitudinal member 31 of the roof structure 18. The lower end of the other member 62 is provided with a fitting 66 adapted to engage a socket 67 on the flatbed frame 11 and the lower end thereof has an angled rod 68 adapted to pass through a lateral hole 69 in the socket 67. A second socket 67a, as shown in FIG. 14, may be provided on the outside of flatbed frame 11 for use with cargo that is the full width of the flatbed frame and a second hole 65a is provided in member 31 for that position of the post. The second socket 67a may be permanently attached to the vehicle or preferrably it is provided in a bracket 76 (shown in FIG. 14 only) which has a fitting 66a, similar to the end 66 of post 60, which fits in permanent socket 67 to support the bracket. In the closed or highway-operating position of post 60 as shown in FIG. 13, the angled rods 64 and 68 on the top and bottom, respectively, of the post 60 lock the post in position and firmly connect the roof to the flatbed frame to prevent the roof from lifting due to wind or vibration. The positive connection of the ends of the post 60 also prevent it from becoming inadvertently dislodged from the roof or flatbed frame. A latch rod 70 is slidably connected to a shaft 71 on the lower end of post member 61 and may be selectively inserted and released from an opening 72 in the flatbed frame or bracket 76 to lock the members 61 and 62 in the vertical position. A safety chain 73 may be provided to releasably hold the latch 70 engaged with the hole 72. A chain 74 is connected to the upper end of the post 60 and at a spaced location 75 to the longitudinal member 31 to prevent accidental or intentional removal of the post from the vehicle. It is to be noted that when installing the post 60 the pivoting action between members 61 and 62 creates a mechanical advantage while pulling down on the lower end of member 62 to lift the roof structure to the desired height against any loads such as snow or the normal deflection of the roof due to gravity. This mechanical advantage increases as the members 61 and 62 approach the parallel condition which is when the greatest force is required.

When the post 60 of FIGS. 12-14 constitutes an obstruction to side loading or unloading of the vehicle, the latch rod 70 is released from the flatbed frame 11 and the member 61 is pivoted relative to member 62 as shown in FIG. 12 to first release the lower end of member 62 from the socket 67 and then allow disengagement of the upper end of member 61 from longitudinal member 31 by an inward twisting motion. The chain 74 will support the post 60 at the spaced location 75 at which the chain 74 is connected to the longitudinal member 31 or the post 60 can be moved to alternate locations to accommodate the loading and unloading. The connections at the top and bottom of the post 60 to the longitudinal member 31 and flatbed frame 11, respectively, are not rigid but rather allow some relative movement therebetween to accommodate the angular, lateral or longitudinal displacement of the roof structure 18 relative to the flatbed 11.

Figures 15, 16:
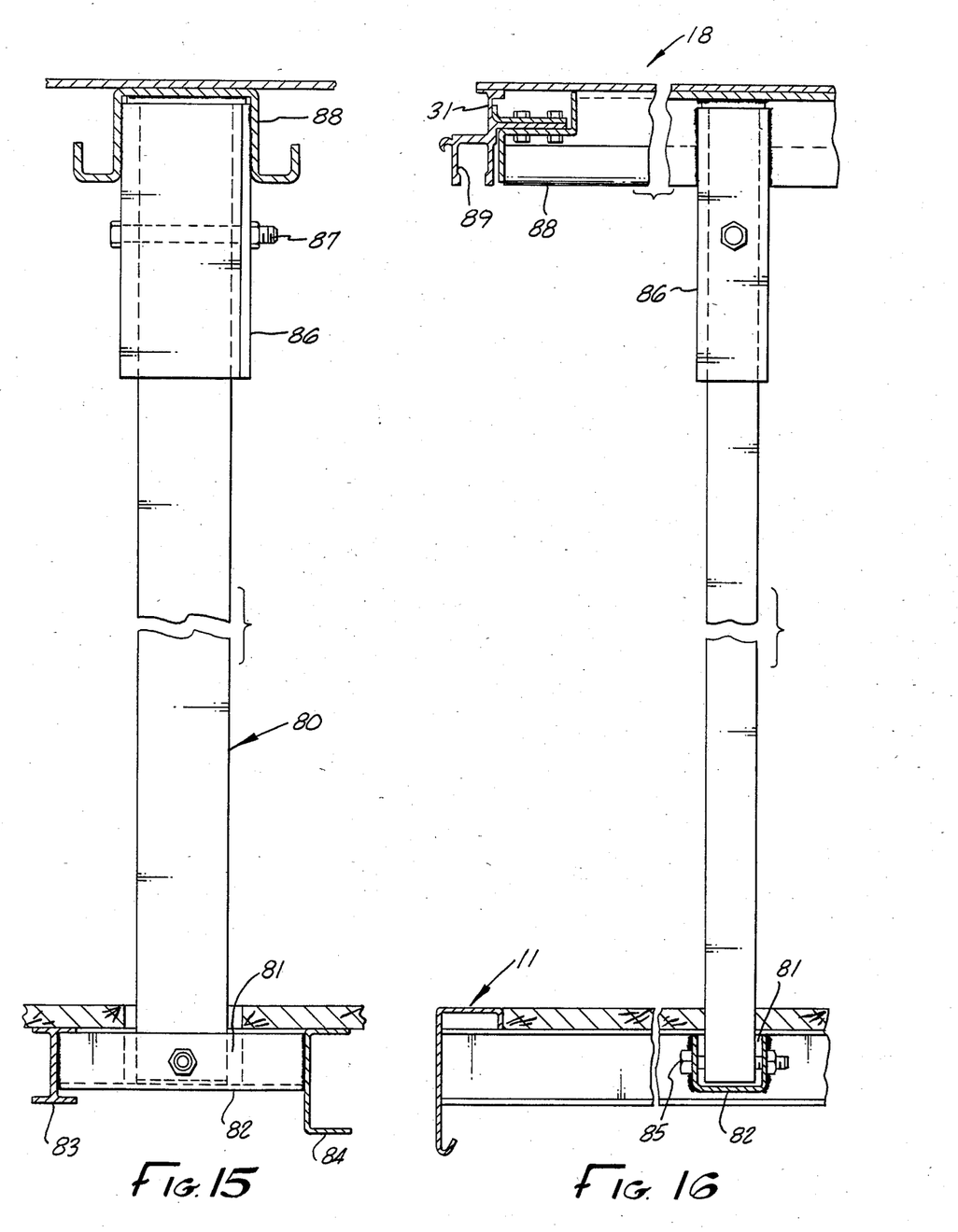
FIG. 15 is a side elevation, partially in section, of a post for mounting intermediate the sides of the vehicle.
FIG. 16 is an end elevation of the post of FIG. 15.

FIGS. 15 and 16 illustrate a post construction, generally designated 80, that may be used interiorly of the side edges of the vehicle either in addition to or as an alternative to one or more of the side posts previously described. The post 80 may be in the center or offset laterally. A socket 81 is provided in the flatbed frame 11 by any convenient means such as a channel 82 welded between two lateral structural members 83 and 84. A bolt 85 pivotally supports the lower end of the interior post 80 to allow pivoting in the longitudinal direction (front-to-rear) of the vehicle. The upper end of post 80 is mounted in a tubular socket 86 by a bolt 87. The socket 86 is welded to a laterally extending roof support 88, the ends of which support the longitudinal structural member 31 having a downwardly facing channel 89 for receiving the rollers that support the side curtains illustrated in FIG. 8. As an alternative, the upper end of post 80 may be pivotally or otherwise flexibly connected to the roof structure 18 and in turn the lower end maybe simi-rigidly or flexibly attached to the flatbed frame. The post 80 is preferably of rectangular cross section, such as a 2" by 4" steel tube, to provide maximum longitudinal strength with minimum lateral obstruction to cargo. As the roof structure 18 shifts longitudinally relative to the flatbed frame 11 on irregular roads, as described above, the post 80 pivots about bolt 85 and the upper support 88 is slightly twisted relative to the side members 31 providing an energy-storing connection between the post and roof.

Having fully described our invention, it is to be understood that we are not to be limited to the details herein set forth but that our invention is of the full scope of the appended claims.

We claim:

1. In a road vehicle for hauling cargo, the combination of: a generally rectangular flatbed frame having opposite ends and being subjected to deflection and longitudinal twisting in service under load, at least one longitudinal member extending over and above the level of the flatbed frame between the opposite ends of the flatbed frame, upright support means including at least two opposed wall frames spaced longitudinally of the flatbed frame and extending vertically thereof between the flatbed frame and the longitudinal member, a plurality of joints interconnecting said wall frames with said longitudinal member and said flatbed frame to define a generally rectangular structural framework of four structural members including the flatbed frame, wall frames and longitudinal member and wherein the longitudinal member is supported by the wall frames and flatbed frame, and wherein at least two of said joints each include means allowing relative angular movement about transverse axes between at least three of said structural members when the framework is subjected to loads during service, and wherein at least one of said joints is constructed to maintain the structural framework erect when subjected to loads during service.

2. The road vehicle of claim 1 including two joints capable of limited movement respectively connecting each said upright wall frame to said flatbed frame.

3. The road vehicle of claim 1 in which one upright wall frame has a movable connection to said flatbed frame and the other wall frame has a rigid connection to said flatbed frame.

4. The road vehicle of claim 1 in which one upright wall frame has a movable connection to said flatbed and the other wall frame has means pivotally connecting it to said flatbed frame.

5. The road vehicle of claims 1, 2, 3 or 4 in which both ends of said longitudinal member are pivotally connected to the wall frames respectively.

6. The road vehicle of claims 1, 2, 3 or 4 in which each longitudinal member has one end thereof connected by a joint means capable of limited movement to one of the wall frames.

7. The road vehicle of claim 1 in which roof structure is provided and includes said longitudinal member, and curtain means are supported from said roof structure for closing each open side of said vehicle.

8. The combination set forth in claim 1 in which each said longitudinal member extends from substantially the top of one wall frame to substantially the top of the other wall frame, and at least one substantially vertical post is located intermediate the length of the flatbed frame, each said post having means connected at its upper end to said longitudinal member and at its lower end to said flatbed frame, which connecting means allow relative angular movement between said posts and both said flatbed frame and said longitudinal member.

9. The road vehicle of claim 8 in which said post is located intermediate the sides of said vehicle.

10. The road vehicle of claim 9 in which said longitudinal member includes a laterally extending support member and said post located intermediate said sides is rigidly connected to said lateral support member and pivotally connected to said flatbed frame.

11. The road vehicle of claim 1 in which two parallel longitudinal members extend from substantially the top of one wall frame to substantially the top of the other wall frame, and at least one vertical post is provided on each of the outer longitudinal edges of said flatbed frame, each of said posts having means connected at its upper end to one of said longitudinal members and at its lower end to said flatbed frame, which connecting means allow relative angular movement between said posts and both said flatbed frame and said longitudinal members.

12. The combination set forth in claim 11 in which said longitudinal members form the sides of a roof extending between said wall frames, snd curtain means are supported from said longitudinal members for selective closure of the sides of the vehicle.

13. The road vehicle of claim 1 including two rigid joints respectively connecting each said upright wall frame to said flatbed frame.

14. The road vehicle of claim 1 in which one upright wall frame has a rigid joint connection to said flatbed frame and the other wall frame has a rigid joint connection to said flatbed frame.

15. The road vehicle of claim 1 in which one upright wall frame has a rigid joint connection to said flatbed frame and the other wall frame has means pivotally connecting it to said flatbed frame.

16. The road vehicle of claims 1, 13, 14 or 15 in which both ends of said longitudinal member are pivotally connected to the wall frame respectively.

17. The road vehicle of claims 1, 13, 14 or 15 in which each longitudinal member has one end thereof connected by rigid joint means to one of the wall frames.

18. In a road vehicle for hauling cargo, the combination of: a generally rectangular flatbed frame subjected to deflection and longitudinal twisting in service under load, an upright wall at the front end of the flatbed frame, means including a joint connecting said upright wall to said flatbed frame and allowing limited relative angular movement therebetween about a transverse axis, a rear wall, laterally spaced longitudinal members extending from the top of the front wall to the top of the rear wall and defining with said walls and flatbed frame a generally rectangular structural framework wherein said longitudinal members are supported by said walls and flatbed frame, and means forming a pivotal connection between at least one end of each of said longitudinal members and one of said walls and between said rear wall and said flatbed frame allowing relative angular movement about transverse axes of said flatbed frame, walls and longitudinal members when subjected to loads during service.

19. The combination set forth in claim 18 in which said joint connecting said front upright wall to said flatbed frame includes means for limiting the extent of tilting movement of said front upright wall.

20. The combination set forth in claim 18 in which two of said longitudinal members extend from the top of the front wall to the top of the rear wall of the outer corners thereof, and a plurality of vertical posts are positioned on each side of the vehicle along the outer longitudinal edges of said flatbed frame, each of said posts having means connected at its upper end to one of said longitudinal members and at its lower end to said flatbed frame, which connecting means allow relative angular movement between said posts and both said flatbed frame and said longitudinal members.

21. In a road vehicle for hauling cargo, the combination of: a generally rectangular flatbed frame subjected to deflection and longitudinal twisting in service under load, first and second upright walls at the opposite ends of the flatbed frame, means including a joint capable of limited movement for connecting at least one of said upright walls to said flatbed frame, means pivotally connecting the other upright wall to the flatbed frame to allow relative angular movement therebetween about a transverse axis, a roof structure including a pair of longitudinal members extending from substantially the top of the first wall to substantially the top of the second wall at the lateral extremities of said walls and defining with said walls and flatbed frame a generally rectangular structural framework wherein the roof structure is supported by the walls and flatbed frame, at least one end of each said longitudinal member having means forming a pivotal connection between that end of said longitudinal member and the adjacent upright wall allowing relative angular movement about transverse axes between the longitudinal members and the adjacent wall, curtain means on each side of said vehicle supported from said longitudinal members and retractable longitudinally, means for connecting the lower edge of the curtain means to the flatbed frame and applying downward tension to the curtain means, and at least one post positioned intermediate said upright walls and having end means connecting to said roof structure and to said flatbed frame for resisting both upward movement of said roof and downward deflection of said roof thereby permitting said tensioning of said curtain means.

22. The road vehicle of claim 21 in which both ends of said longitudinal members are pivotally connected to said walls.

23. The road vehicle of claim 21 in which said end means on said post include means for allowing relative angular movement between said post and said flatbed frame and roof structure.

24. The road vehicle of claim 21, 22 or 23 in which said post is located intermediate the sides of the vehicle.

25. The road vehicle of claims 21, 22 or 23 in which a said post is located on each side of said vehicle.

26. The road vehicle of claim 25 in which said post is comprised of two elongated members with one end of one member pivotally connected to a point intermediate the ends of the other member, and means for locking the two members in parallel relation for the on-highway position and releasing same to allow angular movement to foreshorten the post for release from said connection to the roof structure and flatbed frame.

27. The road vehicle of claim 25 in which each said post includes means for selective manipulation to allow movement of the post from its position connecting said roof structure and flatbed frame to a spaced location for access to the flatbed frame.

28. The road vehicle of claim 21 in which said post is "C" shaped and said ends means are pivotally connected to the flatbed frame and roof structure in a manner to allow limited travel therebetween along the pivotal axis for accommodating relative movement between the flatbed frame and roof structure.

29. The road vehicle of claim 28 in which bearing plates are provided on said flatbed frame and roof structure, and the vertical extemities of said post at said vertical member engage said bearing plates when the post is in the on-highway operative position.

30. The road vehicle of claim 28 in which said post end means is provided with means for releasable connection to said flatbed frame to prevent pivoting of said post including a vertical pin slidably mounted on the lower end of said vertical member, at least one hole in said flatbed frame for engagement by said pin, and means for retaining said pin in the hole-engaging position.

31. In a road vehicle for hauling cargo having an elongated flatbed frame, front and rear walls or frames, a roof structure, and at least one side open, the improvement comprising, at least one post positioned intermediate the longitudinal ends of the flatbed frame, said post having end means connecting to the flatbed frame and the roof structure for both supporting and connecting the roof structure on and to the flatbed frame, said post end means including means for allowing angular movement between the post and the flatbed frame and roof structure while connected thereto for accommodating lateral and longitudinal relative movement between the flatbed frame and roof structure, said post being comprised of two vertical members with one member having one end pivotally connected to the other member intermediate its ends whereby relative pivoting between the two members from a parallel position to an angled position causes foreshortening between the remote ends of the two members for release from the flatbed frame and roof structure, and means for locking the members in parallel relationship.

32. The road vehicle of claim 31 in which said locking means includes the said other member extending downwardly along the said one member to a free near the remote end of the said one member and a latching pin on said free end for engaging the flatbed frame.

33. The road vehicle of claim 31 in which the remote ends of each said vertical members include angled pins for latching the end to the flatbed frame and roof structure, respectively, upon pivoting the vertical members to their vertical and parallel position.

34. The road vehicle of claim 31 in which curtain means are provided and supported from the roof structure for selectively closing each open side of the vehicle.

35. In a road vehicle for hauling cargo with at least one open side, the combination of; a generally rectangular flatbed frame subjected to longitudinal bending and twisting in service under load due to road variations, an upright wall frame at each end of the flatbed frame, a roof structure extending between said upright wall frames, means connecting said upright wall frames to said flatbed frame and roof structure including at least one joint capable of limited movement and located between an upright wall frame and the flatbed frame and at least two pivotal connections allowing relative unrestrained angular movement about transverse axes, and at least one side post positioned on the open side of the vehicle and intermediate the upright walls, said post having upper and lower ends connected to said roof structure and flatbed frame, respectively, and including means to permit movement of said post to a longitudinally spaced position for clear side loading access behind the normal position of said side post.

36. The road vehicle of claim 35 in which said post is collapsible for releasing from said flatbed frame and roof structure connections and movable to an unobstructing position.

37. The road vehicle of claim 35 in which a curtain means is provided and supported from said roof structure on each open side of the vehicle, and means for horizontally and vertically tensioning said curtain means in the position closing the open side.

38. In a road vehicle for hauling cargo having an elongated flatbed frame extending in a longitudinal direction to be supported on wheels and subjected to deflection and longitudinal twisting in service on a roadbed, the combination of a pair of upright wall means spaced along said longitudinal direction and connected to the flatbed frame, at least one longitudinal member extending between and connecting said upright wall means at a level above the flatbed frame, said flatbed frame, wall means and longitudinal member defining a generally rectangular structural framework wherein the longitudinal member is supported by the wall means and flatbed frame, and the four connections formed between the two upright wall means and both the flatbed frame and the longitudinal member respectively including a joint capable of limited movement and three pivotal joints allowing angular movement of the wall means, longitudinal member and flatbed frame relative to each other about transverse axes when the structural framework is loaded while in service.

39. The road vehicle of claim 38 in which at least one of said four connections is rigid.

40. The road vehicle of claim 38 in which one of said four connections has means for limiting the angular movement of the upright wall means at that connection.

41. The road vehicle of claim 38 in which at least one post means is provided intermediate the upright wall means with means connecting said post to said flatbed frame and longitudinal member means, at least one of said post connecting means comprising a non-rigid joint.

42. The road vehicle of claim 41 in which said post connecting means include means for allowing movement of said post to a spaced location for cargo loading and unloading.

43. The road vehicle of claim 38 in which the upright wall means at the forward end of the vehicle has side posts of an open cross-section with the edges disposed to effect a non-square corner configuration.

44. The road vehicle of claim 38 in which the upright wall means at the forward end of the vehicle has side posts of an open cross-section facing outwardly of the vehicle with forward and rearward legs, and said forward leg being shorter than said rearward leg.

45. In a road vehicle for hauling cargo, the combination of: a generally rectangular flatbed frame subjected to deflection and longitudinal twisting in service under load, first and second upright walls at the opposite ends of the flatbed frame, means including a joint capable of limited movement for connecting at least one of said upright walls to said flatbed frame, a roof structure including a pair of longitudinal members extending from substantially the top of the first wall to substantially the top of the second wall at the lateral extremities of said walls, at least one end of each said longitudinal member having means forming a pivotal connection between that end of said longitudinal member and the adjacent upright wall, curtain means on each side of said vehicle supported from said longitudinal members and retractable longitudinally, means for connecting the lower edge of the curtain means to the flatbed frame and applying downward tension to the curtain means, and at least one post positioned intermediate said upright walls and having end means connecting to said roof structure and to said flatbed frame for resisting both upward movement of said roof and downward deflection of said roof thereby permitting said tensioning of said curtain means, and wherein said post is located on each side of said vehicle and is comprised of two elongated members with one end of one member pivotally connected to a point intermediate the ends of the other member, and means for locking the two members in parallel relation for the on-highway position and releasing same to allow angular movement to foreshorten the post for release from said connection to the roof structure and flatbed frame.

46. In a road vehicle for hauling cargo, the combination of: a generally rectangular flatbed frame subjected to deflection and longitudinal twisting in service under load, first and second upright walls at the opposite ends of the flatbed frame, means including a joint capable of limited movement for connecting at least one of said upright walls to said flatbed frame, a roof structure including a pair of longitudinal members extending from substantially the top of the first wall to substantially the top of the second wall at the lateral extremities of said walls, at least one end of each said longitudinal member having means forming a pivotal connection between that end of said longitudinal member and the adjacent upright wall, curtain means on each side of said vehicle supported from said longitudinal members and retractable longitudinally, means for connecting the lower edge of the curtain means to the flatbed frame and applying downward tension to the curtain means, and at least one post positioned intermediate said upright walls and having end means connecting to said roof structure and to said flatbed frame for resisting both upward movement of said roof and downward deflection of said roof thereby permitting said tensioning of said curtain means, and wherein said post is located on each side of said vehicle and includes means for selective manipulation to allow movement of the post from its position connecting said roof structure and flatbed frame to a spaced location for access to the flatbed frame.

47. In a road vehicle for hauling cargo having an elongated faltbed frame extending in a longitudinal direction to be supported on wheels and subjected to deflection and longitudinal twisting in service on a roadbed, the combination of a pair of upright wall means spaced along said longitudinal direction and connected to the flatbed frame, at least one longitudinal member extending between and connecting said upright wall means at a level above the flatbed frame, said flatbed frame, wall means and longitudinal member defining a generally rectangular structural framework wherein the longitudinal member is supported by the wall means and flatbed frame, and the four connections formed between the two upright wall means and both the flatbed frame and the longitudinal member respectively including one rigid joint and three pivotal joints allowing angular movement of the wall means, longitudinal member and flatbed frame relative to each other about transverse axes when the structural frame work is loaded while in service.

* * * * *